(12) United States Patent
Wang et al.

(10) Patent No.: US 8,397,049 B2
(45) Date of Patent: Mar. 12, 2013

(54) TLB PREFETCHING

(75) Inventors: James Wang, Vista, CA (US); Zongjian Chen, Palo Alto, CA (US)

(73) Assignee: Apple Inc., Cupertino, CA (US)

( * ) Notice: Subject to any disclaimer, the term of this patent is extended or adjusted under 35 U.S.C. 154(b) by 854 days.

(21) Appl. No.: 12/501,643

(22) Filed: Jul. 13, 2009

(65) Prior Publication Data

US 2011/0010521 A1    Jan. 13, 2011

(51) Int. Cl.
*G06F 12/00* (2006.01)

(52) U.S. Cl. ............... 711/207; 711/1; 711/6; 711/100; 711/202; 711/203; 711/205; 711/206; 711/213; 711/E12.014; 711/E12.058; 711/E12.059; 711/E12.061; 711/E12.062; 711/E12.078

(58) Field of Classification Search ............ 711/1, 6, 711/100, 202, 203, 205, 206, 207, 213, E12.014, 711/E12.058, E12.059, E12.061, E12.062, 711/E12.078

See application file for complete search history.

(56) References Cited

U.S. PATENT DOCUMENTS

| | | | |
|---|---|---|---|
| 6,175,898 B1 | 1/2001 | Ahmed et al. | |
| 7,553,220 B2 | 6/2009 | Smith | |
| 2007/0033372 A1* | 2/2007 | Everhart et al. | ............... 711/202 |
| 2008/0276067 A1 | 11/2008 | Chen et al. | |

FOREIGN PATENT DOCUMENTS

WO    2006/065416    6/2006

OTHER PUBLICATIONS

International Search Report from PCT/US2010/041728 mailed Oct. 22, 2010, 12 pages.
Bala K., et al., "Software Prefetching and Caching for Translation Lookaside Buffers," First Symposium on Operation Systems Design and Implementation, Nov. 14-17, 1994, Monterey, CA, USENIX Association, US, Jan. 1, 1994, pp. 1-11, XP001544708.

* cited by examiner

*Primary Examiner* — Midys Rojas
(74) *Attorney, Agent, or Firm* — Lawrence J. Merkel; Meyertons, Hood, Kivlin, Kowert & Goetzel, P.C.

(57) ABSTRACT

In an embodiment, a memory management unit (MMU) is configured to retain a block of data that includes multiple page table entries. The MMU is configured to check the block in response to TLB misses, and to supply a translation from the block if the translation is found in the block without generating a memory read for the translation. In some embodiments, the MMU may also maintain a history of the TLB misses that have used translations from the block, and may generate a prefetch of a second block based on the history. For example, the history may be a list of the most recently used Q page table entries, and the history may show a pattern of access that are nearing an end of the block. In another embodiment, the history may comprise a count of the number of page table entries in the block that have been used.

23 Claims, 8 Drawing Sheets

TLB PREFETCHING

BACKGROUND

1. Field of the Invention

This invention is related to the field of processors and, more particularly, memory management units in processors.

2. Description of the Related Art

Processors typically implement address translation. When address translation is enabled, fetch addresses and load/store addresses are effective or virtual addresses. The effective/virtual address is translated through the address translation mechanism to arrive at a physical address (or real address). The terms physical address and real address, as used herein, are intended to be synonymous. The physical/real address is the address actually used to address memory. An effective address is the address generated to fetch the instruction (also referred to as the program counter, or PC, of the instruction) or the address generated from the address operands of a load/store instruction. In some cases, the effective address is equal to the virtual address. In other cases, the virtual address is generated based on the effective address (e.g. translated from the effective address, or generated by applying some predetermined operation on the effective address). The virtual address is then translated to the physical address Address translation is used for a variety of reasons. For example, address translation can be used to provide a larger effective or virtual address space than the amount of physical memory included in the computer system could support. A slower secondary storage (e.g. disk storage) can be used as a page swap storage to swap pages in and out of the memory as needed by the program(s) being executed. Additionally, address translation can be used in multitasking environments to protect one task's memory from access/update by another task, and to provide each task with its own address space independent of which physical pages are allocated to the task. If the overall memory usage of the tasks exceeds the memory size, page swapping can again be used to retain memory contents and provide access to the pages that are currently in use.

Page tables are typically provided in the system memory, and the page tables store the virtual to physical translation mappings. Accordingly, an address translation includes one or more memory accesses to read the translation from the page tables. In order to speed the translation mechanism, many processors implement translation lookaside buffers (TLBs). The TLBs are caches of recently used translations. Accordingly, like a cache miss, a miss in the TLB involves added latency to fetch the translation data from the page tables. In one case, a TLB is programmable with a virtual address range. In response to a translation request in the virtual address range, the TLB can provide the translation and can also prefetch the translation of the next virtual page into the TLB.

SUMMARY

In an embodiment, a memory management unit (MMU) is configured to retain a block of data that includes multiple page table entries. The MMU is configured to check the block in response to TLB misses, and to supply a translation from the block if the translation is found in the block without generating a memory read for the translation. In some embodiments, the MMU may also maintain a history of the TLB misses that have used translations from the block, and may generate a prefetch of a second block based on the history. For example, the history may be a list of the locations of the most recent Q page table entries that have been used (e.g. an entry number within the block), and the history may show a pattern of access that are nearing an end of the block. The MMU may generate a prefetch for the next consecutive block adjacent to the end that is being approached. In another embodiment, the history may comprise a count of the number of page table entries that have been used, and if the count is nearing a total number of the page table entries in the block, the MMU may generate a prefetch.

BRIEF DESCRIPTION OF THE DRAWINGS

The following detailed description makes reference to the accompanying drawings, which are now briefly described.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims. The headings used herein are for organizational purposes only and are not meant to be used to limit the scope of the description. As used throughout this application, the word "may" is used in a permissive sense (i.e., meaning having the potential to), rather than the mandatory sense (i.e., meaning must). Similarly, the words "include", "including", and "includes" mean including, but not limited to.

Various units, circuits, or other components may be described as "configured to" perform a task or tasks. In such contexts, "configured to" is a broad recitation of structure generally meaning "having circuitry that" performs the task or tasks during operation. As such, the unit/circuit/component can be configured to perform the task even when the unit/circuit/component is not currently on. In general, the circuitry that forms the structure corresponding to "configured to" may include hardware circuits. Similarly, various units/circuits/components may be described as performing a task or tasks, for convenience in the description. Such descriptions should be interpreted as including the phrase "configured to." Reciting a unit/circuit/component that is configured to perform one or more tasks is expressly intended not to invoke 35 U.S.C. §112, paragraph six interpretation for that unit/circuit/component.

DETAILED DESCRIPTION OF EMBODIMENTS

Figure 1:
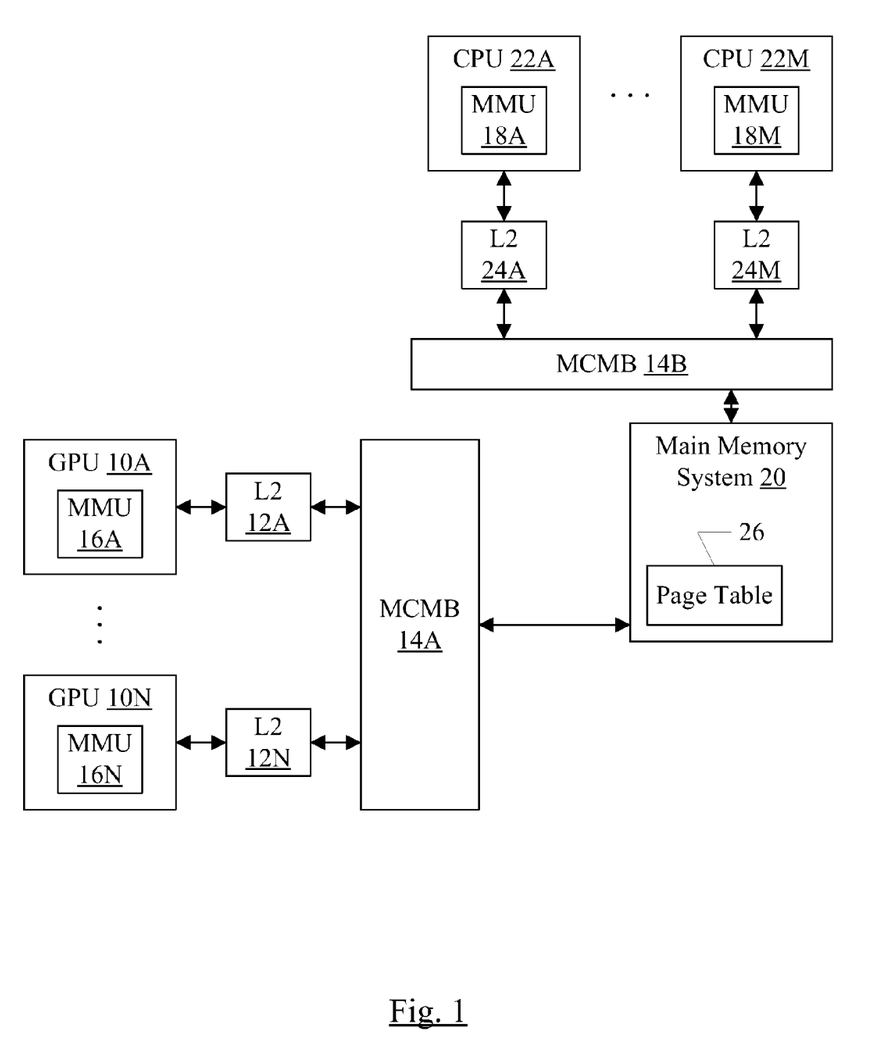
FIG. 1 is a block diagram of one embodiment of a system including one or more memory management units.

Turning now to FIG. 1, a block diagram of one embodiment of a system is shown. In the embodiment of FIG. 1, the system includes one or more graphics processing units (GPUs) 10A-10N each including a memory management unit (MMU) 16A-16N, corresponding level 2 (L2) caches 12A-12N, and a multi-core management block (MCMB) 14A. The MCMB 14A is coupled to the L2 caches 12A-12N, which are coupled to respective GPUs 10A-10N. The MCMB 14A is also coupled to a main memory system 20. The system further includes one or more central processing units (CPUs) 22A-22M each including an MMU 18A-18M, corresponding level 2 (L2) caches 24A-24M, and a multi-core management block (MCMB) 14B. The MCMB 14B is coupled to the L2 caches 24A-24M, which are coupled to respective CPUs 22A-22M. The MCMB 14B is also coupled to a main memory system 20. Components referred to herein by a reference numeral followed by a letter may be similar (but not necessarily identical) to other components having the same reference numeral and a different letter. The components having the same reference numeral and different letters may be collectively referred to by the reference numeral alone (e.g. the GPUs 10A-10N may be referred to collectively as GPUs 10).

The GPUs 10A-10N may implement an instruction set architecture that is optimized for graphics manipulations (e.g. rendering images into a frame buffer, pixel manipulations, etc.). The GPUs 10A-10N may implement any microarchitecture, including scalar, superscalar, pipelined, superpipelined, out of order, in order, speculative, non-speculative, etc., or combinations thereof. The GPUs 10A-10N may include circuitry, and optionally may implement microcoding techniques. Each of the GPUs 10A-10N include MMUs 16A-16N configured to perform address translations. The MMUs 16 may include translation lookaside buffers (TLBs) to cache translations, and may implement translation prefetching as discussed in more detail below. The translations used by the MMUs 16 may be stored in the page tables 26 stored in the main memory system 20. Similarly, the CPUs 22A-22M may implement a general purpose instruction set architecture and may implement any microarchitecture, including any of the above possibilities. The CPUs 22A-22M may implement MMUs 18A-18M, which may also implement translation prefetching as described below. In other embodiments only the MMUs 16 implement translation prefetching, and in still other embodiments, only the MMUs 18 implement translation prefetching. The translations used by the MMUs 18A-18M may also be stored in the page tables 26. The page tables 26 may be shared between the CPUs 22 and the GPUs 10, or the page tables 26 may include separate data structures for CPUs 22 and for GPUs 10. The GPUs 10 and CPUs 22 may be examples of processors, which may be any circuitry configured to execute instructions. A processor may be a discrete integrated circuit, a core integrated onto an integrated circuit, etc. For example, in FIG. 1, the GPUs 10, L2 caches 12, and MCMB 14A may be integrated onto a graphics chip and the CPUs 22, L2 caches 24, and MCMB 14B may be integrated onto a multi-core CPU chip. In another embodiment, the GPUs 10, CPUs 22, L2 caches 12 and 24, and MCMBs 14 may be integrated into an integrated circuit. In some embodiments, the integrated circuit may also include other components integrated with the GPUs/CPUs and related circuitry.

The page tables 26 may store multiple page table entries. Each page table entry may correspond to a page of virtual address space, and may map the addresses in the page to corresponding addresses in a physical page. The page size may vary from embodiment to embodiment. For example, 4 kilobytes or 8 kilobytes may be used. Larger page sizes such as 1, 2, or 4 Megabytes may be used, or even larger. Some embodiments may support more than one page size, and may support multiple page sizes concurrently, as desired.

The GPUs 10 and CPUs 22 may include L1 caches (not shown), and thus the caches 12 and 24 are L2 caches in this embodiment. The L2 caches may have any size and configuration (e.g. set associative, direct mapped, etc.). The L2 caches may also implement any cache block size (e.g. 32 bytes or 64 bytes, or larger or smaller). The cache block size may be the unit of allocation and deallocation in the cache.

The MCMBs 14 may generally provide interconnect between the corresponding processors and the main memory system 20. If cache coherency is implemented, the MCMBs 14 may be responsible for issuing probes (e.g. a request from one processor may result in a probe to the other processors to obtain any modified data in the other processor's L1 or L2 caches, invalidating cached copies for any update request, etc.). The MCMBs may communicate with each other and/or with a memory controller in the main memory system 20. In one embodiment, the memory controller may be implemented on chip with the MCMBs 14, and/or may be part of one of the MCMBs 14. In some embodiments, the MCMBs 14 may also implement level 3 (L3) caches, which may be shared by the L2 caches 12 or 24 coupled to that MCMB 14.

The main memory system 20 may include any type of memory. For example, the memory may comprise dynamic random access memory (DRAM), synchronous DRAM (SDRAM), double data rate (DDR, DDR2, DDR3, etc.) SDRAM (including mobile versions of the SDRAMs such as mDDR3), RAMBUS DRAM (RDRAM), static RAM (SRAM), etc. As mentioned previously, the main memory system 20 may include a memory controller as well.

It is noted that the number of each component in various embodiments may vary. For example, one or more GPUs 10A-10N may be provided, and one or more CPUs 22A-22M is provided. In other embodiments, there may be no GPUs and/or no CPUs. As indicated by ION and 22M, the number of one processor may differ from the number of the other processor. L2 caches 12 and 24 are shown in FIG. 1 to be associated with respective processors, but may be shared by subsets of the processors in other embodiments. In still other embodiments, there may be no L2 caches.

Figure 2:
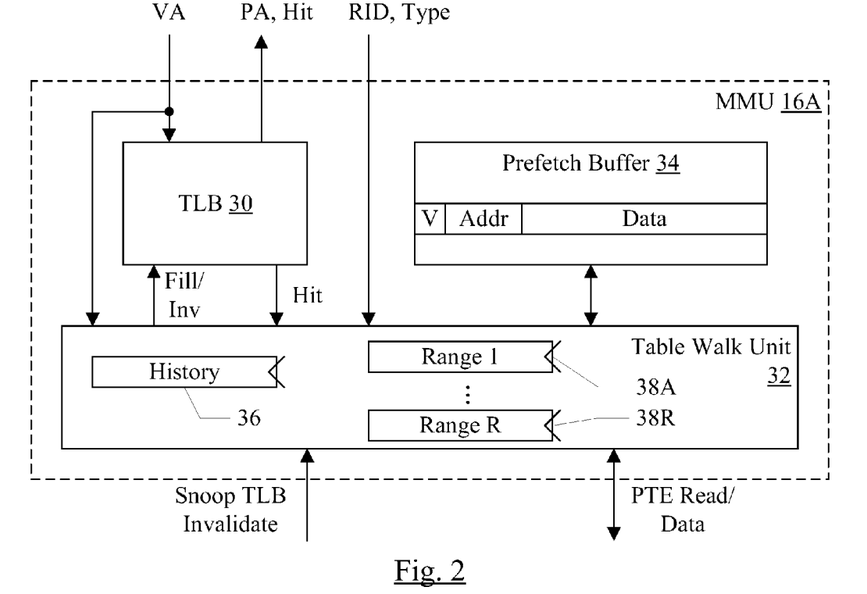
FIG. 2 is a block diagram of one embodiment of a memory management unit.

Turning now to FIG. 2, a block diagram of one embodiment of the MMU 16A is shown. Other MMUs 16 and/or the MMUs 18 may be similar. In the embodiment of FIG. 2, the MMU 16A includes a TLB 30, a table walk unit 32, and a prefetch buffer 34. The table walk unit 32 is coupled to the TLB 30 and the prefetch buffer 34. The TLB 30 and the table walk unit 32 are coupled to receive a virtual address (VA) to be translated, and the table walk unit 32 is further coupled to receive a corresponding requester identifier (RID) and/or a corresponding request type for the virtual address. The TLB 30 is coupled to provide a physical address (PA) and a hit signal to the requestor, and the TLB 30 is further coupled to provide the hit signal to the table walk unit 32. The table walk unit 32 is coupled to communicate translation fills and invalidations to the TLB 30 as well (Fill/Inv in FIG. 2). The table walk unit 32 is coupled to receive an indication of a snooped TLB invalidation (Snoop TLB Invalidate in FIG. 2). The table walk unit 32 is further coupled to transmit page table entry (PTE) read requests and to receive the corresponding data (PTE Read/Data in FIG. 2). In the illustrated embodiment, the table walk unit 32 includes a history register or registers 36 and a set of address range registers 38A-38R. Other embodiments may not include one or more both of the registers 36 and/or 38A-38R.

The MMU 16A may receive virtual addresses to be translated from any source (e.g. fetch logic in the GPU 10A, to fetch instructions, or load/store logic, to perform load/store operations). The TLB 30 may be configured to lookup the virtual address and detect a hit or miss for the virtual address. A TLB hit is detected if a translation from the virtual address to a physical address is recorded in the TLB 30, and a miss is detected if the translation is not recorded in the TLB 30. The TLB 30 may be configured to signal the hit (hit signal asserted) or miss (hit signal deasserted) and may be configured to transmit the physical address based on the hitting entry (PA). Translations may be managed on a page basis, as mentioned previously. That is, a given translation recorded in the TLB 30 may translate any virtual address within a virtual page to a corresponding physical address within the physical page identified by the translation. In some embodiments, the VA input to the TLB 30 may be the page portion of the VA (e.g. excluding the page offset bits) and the PA output by the TLB 30 may also be the page portion of the physical address, also referred to as the physical page number. The complete physical address may be the physical page number concatenated with the page offset bits.

The table walk unit 32 may be coupled to receive the hit signal, and may be configured to attempt to locate a translation for a virtual address that misses in the TLB 30 (referred to as a "table walk"). In one embodiment, the table walk unit 32 is configured to read a block of data including multiple page table entries from the page tables 26 in response to a TLB miss, and is configured to write the block of data to the prefetch buffer 34 in addition to updating the TLB 30 with the translation for the missing VA, which is in one of the page table entries within the block. The block of data containing multiple page table entries will be referred to as a prefetch block, herein, for conciseness. For subsequent TLB misses, the table walk unit 32 may search the prefetch buffer 34 prior to issuing a read request to read another prefetch block from the page tables 26. If the table walk unit 32 locates the page table entry for the virtual address in the prefetch buffer 34, the table walk unit 32 may be configured to write the translation to the TLB 30 and may not issue the read request. If the page table entry for the virtual address is not located in the prefetch buffer 34, the table walk unit 32 may be configured to initiate the read request. The table walk unit 32 may be configured to write the prefetch block received in response to the read request to the prefetch buffer 34, as well as updating the TLB 30 as mentioned previously.

To the extent that subsequent TLB misses find translations in the block in the prefetch buffer 34, the latency for processing TLB misses may be reduced. Latency for the corresponding instruction fetches/data accesses may thus be reduced as well, and performance may be increased, in some embodiments. The prefetch block may comprise page table entries from consecutive memory locations in the page tables 26 in the memory system 20. Page table entries that are located in consecutive entries may typically map virtual addresses that are in consecutive pages of the virtual address space. The virtual address (or at least a portion thereof) may be used with the base address of the page tables 26 to lookup the translation in the page tables 26. Accordingly, virtual addresses that are numerically close to each other may have translations stored in page table entries that are close to each other in the page tables 26. Accordingly, data structures that are accessed in a regular, predictable fashion may benefit from the prefetch blocks stored in the prefetch buffer 34, in an embodiment.

In some embodiments, the table walk unit 32 may implement the reading of a prefetch block and the storing of the prefetch block in the prefetch buffer 34 for any virtual address. In other embodiments, the table walk unit 32 may be programmable (in the range registers 38A-38R) with virtual address ranges that have been identified as likely to benefit from the prefetch blocks stored in the prefetch buffer 34. For example, the frame buffer used by graphics devices such as the GPUs 10A-10N may often be accessed in a regular pattern, as rows of pixels or tiles are read/written. Other examples may include scientific code operating on large arrays of input data. If the range registers 38A-38R are implemented, the table walk unit 32 may limit the reading of the prefetch block to the virtual addresses that are within one of the ranges. For addresses outside of the range, the table walk unit 32 may read the page table entry that is needed for the translation, and may receive more than one page table entry in the data returned in response to the read request, but the table walk unit 32 may not write the received page table entries to the prefetch buffer 34.

The registers 38A-38R may define the ranges in any desired fashion. For example, each register may store a base address and a limit (or size), or a base address and an end address.

In some embodiments, the translation request may include type information which may provide more information about the source of the request. For example, in a graphics embodiment, the type may indicate texture map access, frame buffer access, object access, etc. Some types of accesses may be more likely to benefit from the storage of prefetch blocks in the prefetch buffer 34 (e.g. the frame buffer or texture map access). The table walk unit 32 may be configured to retain the prefetch block in the prefetch buffer 34 or to not retain the prefetch block in the prefetch buffer 34 based on the type of the request. Other embodiments may have different types (e.g. instruction fetch versus data access, or types of data access such as the addressing mode used to generate the virtual address).

The prefetch buffer 34 may be configured to store any number of one or more prefetch blocks. In an embodiment, the prefetch buffer 34 may store one prefetch block, and the current prefetch block may be overwritten by a new prefetch block when read by the table walk unit 32. Other embodiments may store a few prefetch blocks (e.g. 2 or 4). Embodiments may include capacity in the prefetch buffer 34 for any desired number of prefetch blocks. The prefetch buffer 34 may be implemented from any storage circuitry (e.g. static random access memory (SRAM), clocked storage devices such as registers or flops, etc.).

A prefetch block storage entry in the prefetch buffer 34 is shown in FIG. 2. The entry may include a valid bit (V), an address field (Addr) identifying the base address (Addr) of the prefetch block, and the prefetch block data (Data). In other embodiments, the valid bit may be a valid field, which may validate the prefetch block in portions. For example, if a prefetch block comprises multiple cache blocks in size, and the cache block is the largest single transfer available to the table walk unit 32, the read request for the prefetch block may involve multiple requests and cache blocks returned to the table walk unit 32. Accordingly, the valid field may validate cache blocks as they are written to the prefetch buffer 34. In another embodiment, the valid field may validate individual page table entries. Such a valid field may be implemented with regard to PTE invalidations, discussed further below.

The table walk unit 32 may be configured to maintain multiple prefetch blocks based on the requester ID (e.g. a given requester ID may be associated with a given prefetch block in the prefetch buffer 34). If prefetch blocks are associated with requester IDs, and a new prefetch block is written into the prefetch buffer 34 by the table walk unit 32, the new prefetch block may replace a previous prefetch block associated with the same requestor ID. Blocks associated with other requestor IDs may thus be unaffected. Alternatively, two or more prefetch blocks may be stored for a given requestor. For example, if two prefetch blocks are stored for a given requester, the next prefetch block may be prefetched early with regard to exhausting the page table entries in the current prefetch block, since the next prefetch block may not overwrite the current prefetch block in the prefetch buffer 34. Such operation may be implemented if active prefetching is implemented.

The above description may refer to a passive form of prefetch in which a prefetch block is read in response to a TLB miss and the block is retained in the prefetch buffer 34, including unused page table entries. The unused page table entries in the prefetch block have effectively been read before they are requested directly in response to a TLB miss, and thus may be viewed as prefetched. That is, a prefetch may generally read page table entries that have not yet been requested, but have some likelihood of being requested in the future. Other embodiments may perform an active prefetch, in which the table walk unit 32 may attempt to predict a block of page table entries that may be needed in the near future, and may prefetch the block including the predicted entries. In one embodiment, the history register 36 may be provided for active prefetching. The table walk unit 32 may store data in the history register 36 that is indicative of recently used page table entries, and may attempt to detect a pattern in the history to predict a prefetch block. The table walk unit 32 may generate a prefetch request in response to the prediction, and may write the prefetch block to the prefetch buffer 34. Embodiments that store multiple prefetch blocks in the prefetch buffer 34 may include multiple history registers 36 (or multiple fields in a register 36) to store separate history for each block.

The history data may be any data that represents recent page table entries that have been loaded from a prefetch block into the TLB 30. That is, the history data may be a history of use of the page table entries, or a history of consumption of the page table entries by TLB misses. For example, the history may identify the Q most recent page table entries that have been loaded, where Q is an integer greater than or equal to one. In an embodiment, the page table entries in the prefetch block may be assigned entry numbers, beginning at the lowest-addressed page table entry in the prefetch block and increasing as addresses increase. The entry numbers may be stored in the history. Based on the pattern of the entry numbers, a prefetch prediction may be made. For example, if the entry numbers are monotonically increasing and are near (or have reached) the last entry number, a prefetch of the next consecutive (higher addressed) block may be generated. Similarly, if the entry numbers are monotonically decreasing and are near (or have reached) the first entry number, a prefetch of the previous (lower addressed) block may be generated. It is noted that, when addresses are referred to as higher or lower than other addresses, the numerical value of the addresses are being referred to.

In another embodiment, the history may comprise a count of a number of page table entries that have been loaded from the prefetch block. Based on the count and the number of page table entries in the prefetch block, a prediction that the prefetch block is nearly exhausted or is exhausted may be made. In an embodiment, the most recent entry number may also be recorded, so that a prediction of the next consecutive or previous prefetch block may be made.

As mentioned above, the size of the prefetch block need not be the same size as a cache block. In fact, the prefetch block may be any size, as desired, including sizes that are less than a cache block or greater than a cache block. The prefetch block may store a selected number of page table entries. Page table entries may vary in size based on the size of the physical address. For example, a 32 bit physical address may be represented in a 4 byte page table entry and a 64 bit physical address may be represented in a 8 byte page table entry, in one embodiment. The physical address bits not represented in the entry may store various attributes. Embodiments that also include a virtual address tag may be larger than the above sizes.

When software is modifying the page table entries to change translations, software may invalidate one or more TLB entries. The invalidation may occur via the request interface, if the software is executing on the processor attached to the MMU 16A, or may be snooped from an external interface, if the software is executing elsewhere. In addition to invalidating the specified entry(ies) in the TLB 30, the table walk unit 32 may also invalidate corresponding page table entries in the prefetch buffer 34. In one embodiment, the table walk unit 32 may simply invalidate the prefetch blocks stored in the prefetch buffer 34. Alternatively, as noted above, the valid indication for a prefetch block may permit invalidating individual page table entries or subsets of page table entries. In such embodiments, the table walk unit 32 may determine the page table entry that is being updated, and invalidate the page table entry or subset in the prefetch buffer 34. In embodiments that store multiple prefetch blocks in the prefetch buffer 34, the table walk unit 32 may invalidate the affected prefetch block while keeping other blocks valid.

In some embodiments, the MMU 16A may include separate instruction and data TLBs to translate instruction fetches and load/store accesses, respectively. The instruction and data TLBs may be physically located near the instruction fetch logic and the load/store logic, respectively. Furthermore, embodiments of the MMU 16A may be used for non-processor components (e.g. direct memory access (DMA) controllers, input/output (I/O) devices, etc.).

Figure 3:
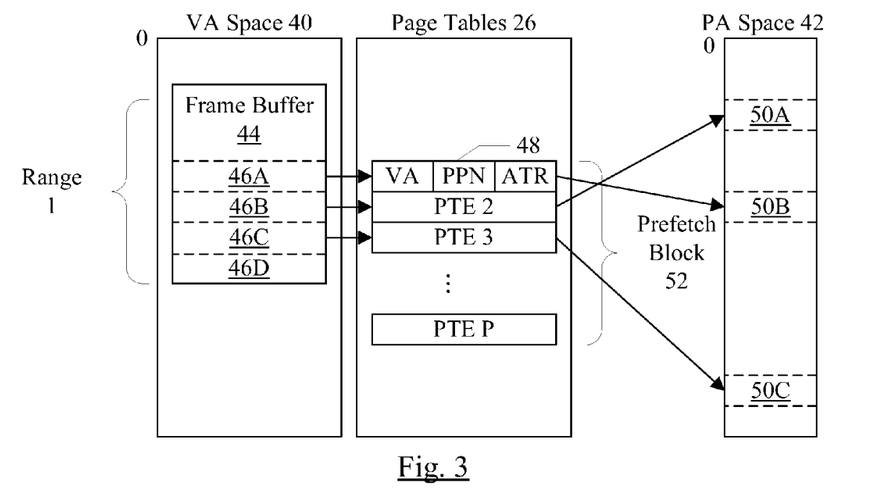
FIG. 3 is a block diagram of one embodiment of a virtual address space, page table entries, and a physical address space.

Turning now to FIG. 3, a block diagram illustrating a virtual address space 40, the page tables 26, and a physical address space 42 is shown. The page tables 26 are stored in the physical address space 42 as well, but are shown separately in the drawing to aid illustration. As illustrated in FIG. 3, address 0 of the VA space 40 and the PA space 42 may be at the top of the figure, and increasing addresses may proceed downward.

In the VA space 40, a frame buffer 44 is shown. The frame buffer 44 may occupy multiple contiguous pages in the VA space 40. The pages are illustrated between dashed lines in FIG. 3, e.g. virtual page 46A, 46B, 46C, 46D. The number of pages occupied by the frame buffer 44 may depend on the page size and the size of the frame buffer 44. The size of the frame buffer 44 may depend on the screen resolution size, the number of bits of data per pixel in the display resolution, etc.

Each virtual page 46 may be translated by a page table entry (PTE) in the page tables 26. The PTEs are allocated by software, and may not be valid in the page tables 26 at a given point in time. FIG. 3 illustrates a point in time when all the PTEs for the frame buffer 44 are valid in the page tables 26. Specifically, PTEs I to P are illustrated in FIG. 3. Exemplary contents of a PTE are shown in PTE 1 in FIG. 3 (reference numeral 48). As shown, the PTE may include a virtual address tag field (VA), a physical page number (PPN), and various other attributes (ATR). The virtual address tag may be included for embodiments in which the complete virtual address is not consumed by the lookup in the page tables 26. That is, some address translation mechanisms utilize each virtual address bit (excluding the page offset) along with the base address of the page tables 26 to locate the PTE storing the translation for the virtual address. In such a mechanism, each virtual address uniquely locates one PTE, and no VA tag may be needed. In other embodiments, at least some of the page portion of the virtual address is not used in the lookup, and thus multiple virtual addresses may alias to the same PTE for a translation. The VA tag may be compared to the unused virtual address bits to confirm that the translation corresponds to the particular virtual address for which the lookup is performed. The physical page number is the page portion of the physical address, which may be concatenated with the page offset portion of the virtual address to from the physical address of an access within the page. The attributes may specify other properties of the page, such as cacheability and cache related control, privilege level restrictions (e.g. user or supervisor), a valid bit indicating validity of the translation, read/write permissions to the page, etc.

As illustrated by the arrows between the virtual pages 46A, 46B, and 46C to the PTEs 1, 2, and 3 in the page tables 26, contiguous virtual pages locate contiguous PTEs in the page tables 26. This behavior may be observed because contiguous virtual pages may differ numerically from each other by only one in the page portion of the address. Generally, a page (or block) may be contiguous to another page (or block) if there are no other pages (blocks) between the contiguous pages (blocks). Contiguous pages (blocks) may also be referred to as consecutive, and a contiguous page (block) at the next higher numerical address to a given page (block) may be referred to as the next consecutive page (block).

In the physical address (PA) space 42, various physical pages are illustrated between dashed lines (e.g. physical pages 50A, 50B, and 50C). The PPN field of each PTE may point to one of the physical pages. The assignment of virtual pages to physical pages is under the control of software, and may be arbitrary. Thus, PTE 1 may map virtual page 46A to physical page 50B; PTE 2 may map virtual page 46B to physical page 50A; and PTE 3 may map virtual page 46C to physical page 50C. In other embodiments, software may attempt to map consecutive virtual pages of a data structure such as the frame buffer 44 to consecutive physical pages in the physical address space 42.

As mentioned previously, some access patterns to the frame buffer 44 may be fairly regular. For example, reading the frame buffer for display is usually performed from top to bottom as shown in FIG. 3, to match the refresh of the display screen by the display hardware. Accordingly, a TLB miss by one virtual page in the frame buffer 44 may be likely to be followed by more TLB misses for consecutive virtual pages, which may access consecutive PTEs in the page tables 26. Accordingly, when the table walk unit 32 fetches the PTE for a TLB miss, the table walk unit 32 may be configured to prefetch the block of PTEs that includes the PTE for the TLB miss. For example, the prefetch block 52 is shown in FIG. 3, and includes PTEs 1 to P (where P is a positive integer greater than 3 as shown in FIG. 3). For example, if a TLB miss occurs for virtual page 46A, the prefetch block 52 may be prefetched and stored into the prefetch buffer 34. If subsequent TLB misses occur for virtual pages 46B, 46C, and/or 46D, the table walk unit 32 may check the prefetch buffer 34 and find the PTEs 2, 3, and 4 (not shown in FIG. 3) in the prefetch buffer 34. Accordingly, a main memory read may be avoided for those TLB misses.

For embodiments that implement the range registers 38A-38R, the virtual address range of the frame buffer 44 may be programmed into one of the range registers 38A-38R (e.g. range 1 register 38A, illustrated by the brace labeled "Range 1" in FIG. 3). Other range registers 38B-38R may be programmed to other ranges, such as texture maps, etc.

Figure 4:
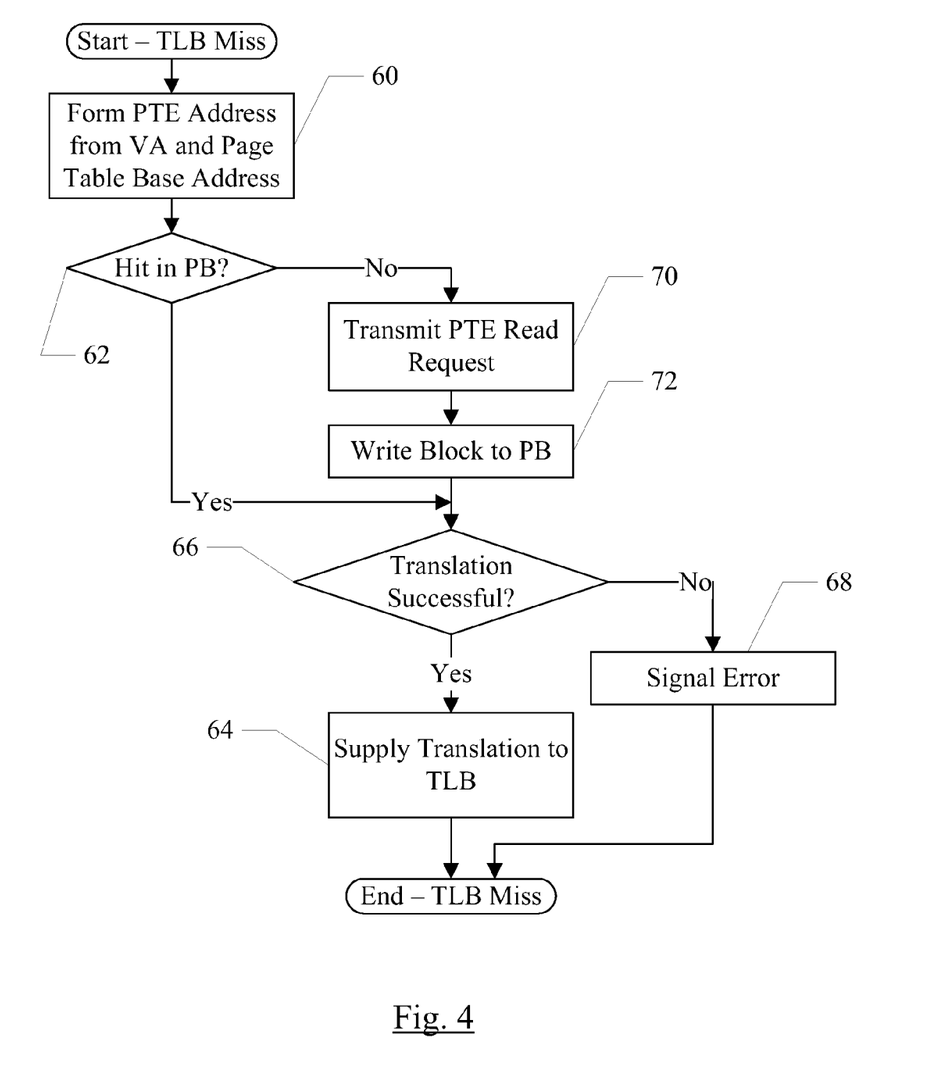
FIG. 4 is a flowchart illustrating operation of one embodiment of a memory management unit in response to a translation lookaside buffer miss.

Turning now to FIG. 4, a flowchart is shown illustrating operation of one embodiment of the MMU 16A (and more particularly the table walk unit 32) in response to a TLB miss in the TLB 30. That is, the MMU 16A/table walk unit 32 may be configured to implement the operation illustrated in FIG. 4. While blocks are shown in a particular order for ease of understanding, other orders may be used. Blocks may be performed in parallel in combinatorial logic in the MMU 16A/table walk unit 32. Blocks, combinations of blocks and/or the flowchart as a whole may be pipelined over IS multiple clock cycles. The flowchart of FIG. 4 illustrates operation in response to a TLB miss. The MMU 16A/table walk unit 32 may be configured to process more than one TLB miss in parallel. Furthermore, in pipelined embodiments, TLB misses may be pipelined and thus there may be multiple TLB misses at various stages of processing. For example, while one TLB miss is awaiting return of a prefetch block from memory, another TLB miss may check the prefetch buffer and detect a hit.

The table walk unit 32 may be configured to form the address of the PTE from the missing virtual address and the page table base address that locates the page tables 26 in the main memory system 20 (block 60). In this embodiment, the page tables 26 are stored at physical addresses in the main memory system 20, and the address of the PTE is a physical address. In other embodiments, the page tables 26 may be located in virtual address space, and the address may be virtual. Mechanisms for virtually addressing the page tables 26 while ensuring the accessibility of the page tables 26 are known (e.g. unity mapping the page tables). It is noted that some address translation mechanisms use multiple lookups in the page table in a hierarchical fashion (e.g. forming a PTE address from the page table base address and a first portion of the virtual address, reading a PPN from the PTE and forming another PTE address using the PPN and a second portion of the virtual address, etc., until each portion of the virtual address has been used). In such embodiments, the block 60 may include the multiple lookups. The table walk unit 32 may search for each PTE entry in the prefetch buffer 34. Prefetch blocks for each level may be maintained in the prefetch buffer 34, or only prefetch blocks for the last level may be stored. Other embodiments may use a single level lookup (e.g. hashing the page portion of the VA to select an entry and using the VA tag, using least significant bits of the page portion of the VA and using the VA tag for the remainder of the VA, selecting a group of entries based on a portion of the VA and reading multiple consecutive entries, or any other fashion).

The table walk unit 32 may be configured to check the prefetch buffer 34 for a hit (decision block 62). The check for a hit may be performed at the granularity of the IS prefetch block. That is, the address of the PTE may be compared to the address tagging the prefetch buffer entry, masking off bits the define an offset with the prefetch block. If the PTE is a hit in the prefetch buffer 34 (decision block 62, "yes" leg), the table walk unit 32 may be configured to determine if the PTE successfully provides a translation (decision block 66). A translation may be unsuccessful if the PTE is not valid, or if the attributes indicate that the requester is not permitted to make the desired access (e.g. privilege level violations, read/write violations, etc.). If the translation is successful (decision block 66, "yes" leg), the table walk unit 32 may be configured to use the PTE from the prefetch buffer 34 to supply the translation to the TLB 30 (block 64). That is, the translation from the PTE may be loaded into the TLB 30. The format of the translation data in the TLB 30 may be different from the PTE, and the table walk unit 32 may be configured to format the TLB entry and write the formatted entry to the TLB 30. The TLB entry may include the attributes from the TLB entry (or subsets thereof that may be needed for use of the translation), the PPN, and a portion or all of the page portion of the virtual address for matching against translation requests. If the translation is unsuccessful (decision block 66, "no" leg), the table walk unit 32 may signal an error (block 68). The error may be signaled in any desired fashion, in various embodiments (e.g. interrupt, exception, etc.). The signal may cause software to be called to handle the lack of translation.

On the other hand, if the PTE is not a hit in the prefetch buffer 34 (decision block 62, "no" leg), the table walk unit 32 may transmit a PTE read request (block 70). In embodiments that limit the prefetching to a range or type, the PTE read request may be for a single PTE entry if the VA is not in the range or the type is not one of the prefetchable types, and the table walk unit 32 may not write the data that is returned into the prefetch buffer 34. If the VA is in range, or the type is one of the prefetchable types, or the table walk unit 32 prefetches any PTE as a prefetch block, the PTE read request may be a request for the prefetch block that includes the PTE. The table walk unit 32 may await receipt of the prefetch block from the memory system, and may write the returned prefetch block to the prefetch buffer (block 72). The table walk unit 32 may overwrite the current prefetch block in the prefetch buffer 34, or may overwrite the current prefetch block associated with the requester or type, in various embodiments. In embodiments that may store multiple prefetch blocks for the requestor/type, the prefetch block may overwrite the oldest prefetch block for that requestor/type, or a replacement scheme such as least recently used (LRU), any of its variants, may be used, or any other replacement scheme may be used. The table walk unit 32 may also determine if the translation is successful, and signal an error or load the translation into the TLB 30, as appropriate (blocks 66, 64, and 68).

The flowchart of FIG. 4 illustrates a passive prefetching embodiment, in which a prefetch block is read in response to a TLB miss that uses a PTE within the block. Other embodiments may maintain a history of the use of the PTEs within a prefetch block, and may predict when another PTE is needed to generate a prefetch request for the prefetch block. That is, the prefetch block may be prefetched before any of the PTEs within the prefetch block are needed.

Figure 5:
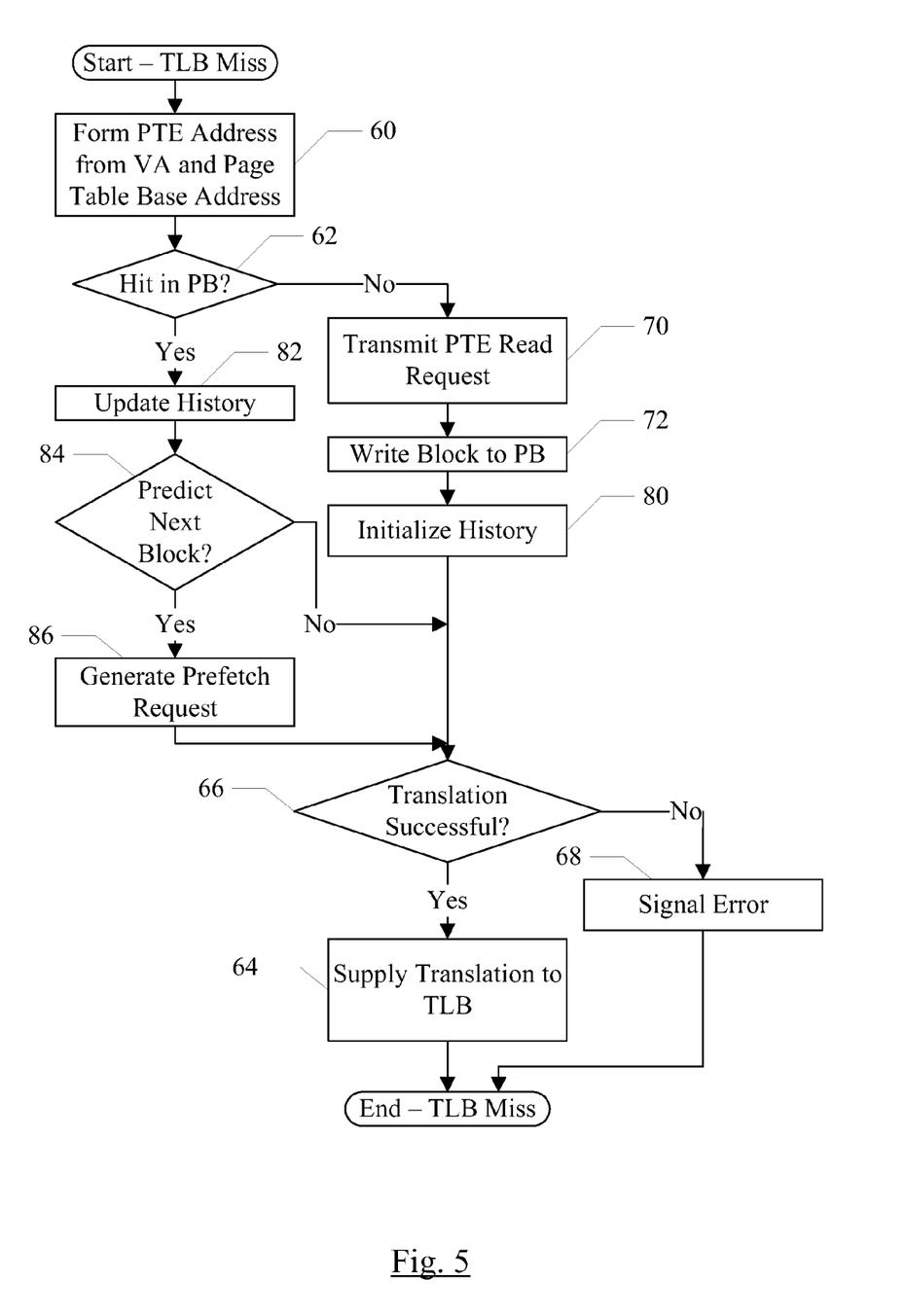
FIG. 5 is a flowchart illustrating operation of another embodiment of a memory management unit in response to a translation lookaside buffer miss.

FIG. 5 is a flowchart is shown illustrating operation of one embodiment of the MMU 16A (and more particularly the table walk unit 32) in response to a TLB miss in the TLB 30 for an active prefetch scheme. That is, the MMU 16A/table walk unit 32 may be configured to implement the operation illustrated in FIG. 5. While blocks are shown in a particular order for ease of understanding, other orders may be used. Blocks may be performed in parallel in combinatorial logic in the MMU 16A/table walk unit 32. Blocks, combinations of blocks and/or the flowchart as a whole may be pipelined over multiple clock cycles. The flowchart of FIG. 5 illustrates operation in response to a TLB miss. The MMU 16A/table walk unit 32 may be configured to process more than one TLB miss in parallel. Furthermore, in pipelined embodiments, TLB misses may be pipelined and thus there may be multiple TLB misses at various stages of processing. For example, while one TLB miss is awaiting return of a prefetch block from memory, another TLB miss may check the prefetch buffer and detect a hit.

Similar to FIG. 4, the embodiment of FIG. 5 includes forming the PTE address, checking for a hit in the prefetch buffer 34, generating the PTE read request if the PTE address is a miss in the prefetch buffer 34, writing the received prefetch block to the prefetch buffer 34, determining if the translation is successful and loading the translation into the TLB 30 or signalling the error (blocks 60, 62, 64, 66, 68, 70, and 72).

Additionally, the table walk unit 32 may be configured to initialize the history corresponding to the prefetch block when writing the prefetch block to the prefetch buffer 34 (block 80). The history may be initialized in different fashions, depending on the history data that is maintained. For example, if the history is an indication of the last Q accesses to the prefetch block (e.g. entry numbers relative to the first entry in the prefetch block), the history may be initialized by recording the entry number of the current request as the most recent request and clearing the other entry numbers. If the history is a count, the count may be set to zero. Alternatively, if the requested PTE is not at one end of the prefetch block, the count may be initialized to the entry number of the PTE within the prefetch block. Such an initialization may be useful if, for example, the first few PTEs in the prefetch block were TLB hits and thus may not be requested. In another embodiment, the initialization may depend on the entry number. If the entry is nearest the low end of the prefetch block, the count may be initialized to the entry number, assuming that addresses are being traversed in numerically increasing order. If the entry is nearest the high end of the prefetch block, the count may be initialized to P minus the entry number (where P is the number of PTEs in a prefetch block), assuming that the addresses are being traversed in numerically decreasing order.

In response to a hit in the prefetch buffer, the table walk unit 32 may be configured to update the history (block 82). For example, the table walk unit 32 may insert the entry number of the PTE as the most recent access, and move other entry numbers down the list, if the Q most recent entry numbers are stored as the history. If the history is a count, the table walk unit 32 may be configured to increment the count. Other embodiments may implement other forms of history.

The table walk unit 32 may be configured to examine the updated history to determine if the history indicates that a prefetch request should be generated for the next predicted block (decision block 84). The next predicted block may be the next consecutive block, or the immediately preceding block, from the current block according to the direction that the PTEs are being used in within the block. If the table walk unit 32 determines that a prefetch request is to be generated, the table walk unit 32 may be configured to generate the prefetch request (block 86).

FIGS. 4 and 5 have generally referred to a single prefetch block. In embodiments in which multiple prefetch blocks may be stored in the prefetch buffer 34, the search for prefetch buffer hit may be applied across all prefetch blocks. Alternatively, the search may be restricted to only those prefetch blocks associated with the same requester or address range. Additionally, if more than one prefetch block is associated with a given requester, a new prefetch block may overwrite the oldest prefetch block associated with the given requestor, or the least recently used block, as desired.

Figure 6:
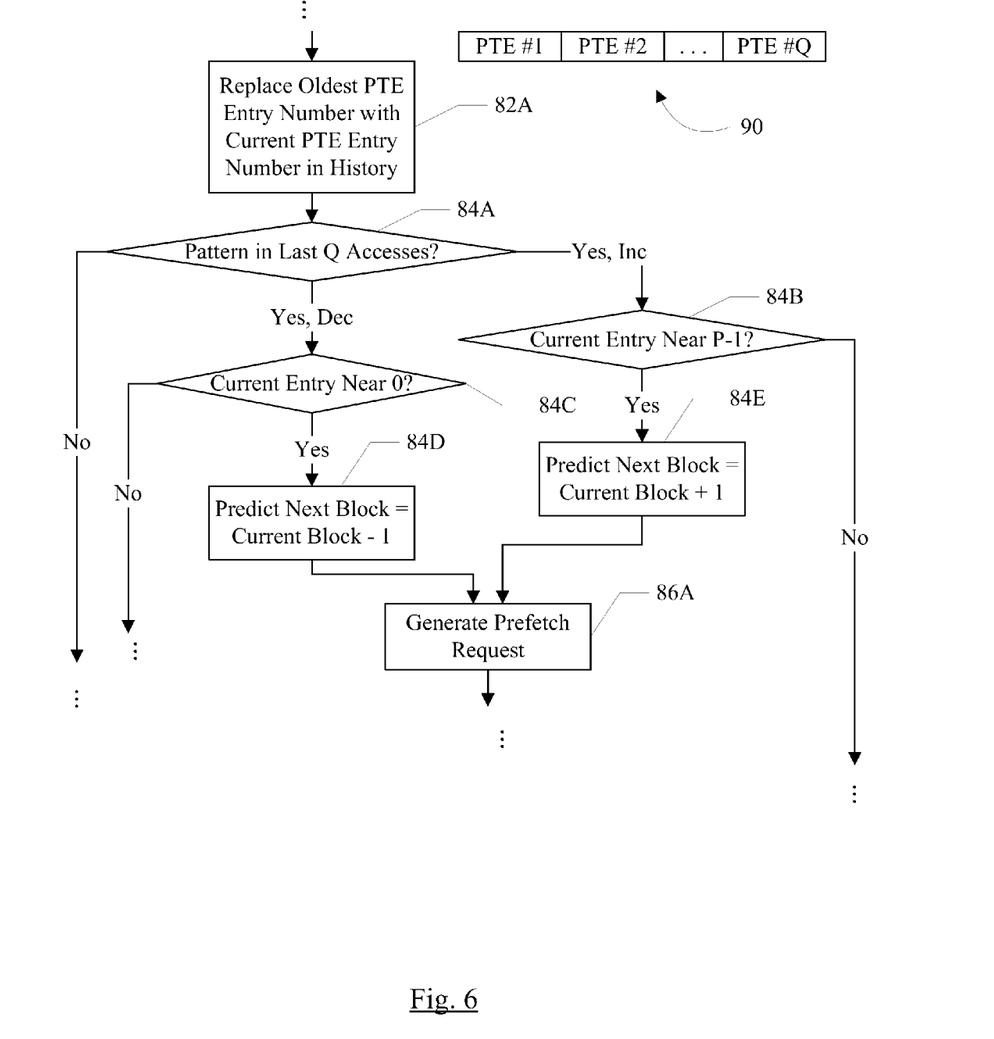
FIG. 6 is a flowchart illustrating one embodiment of a portion of the flowchart shown in FIG. 5.
Figure 7:
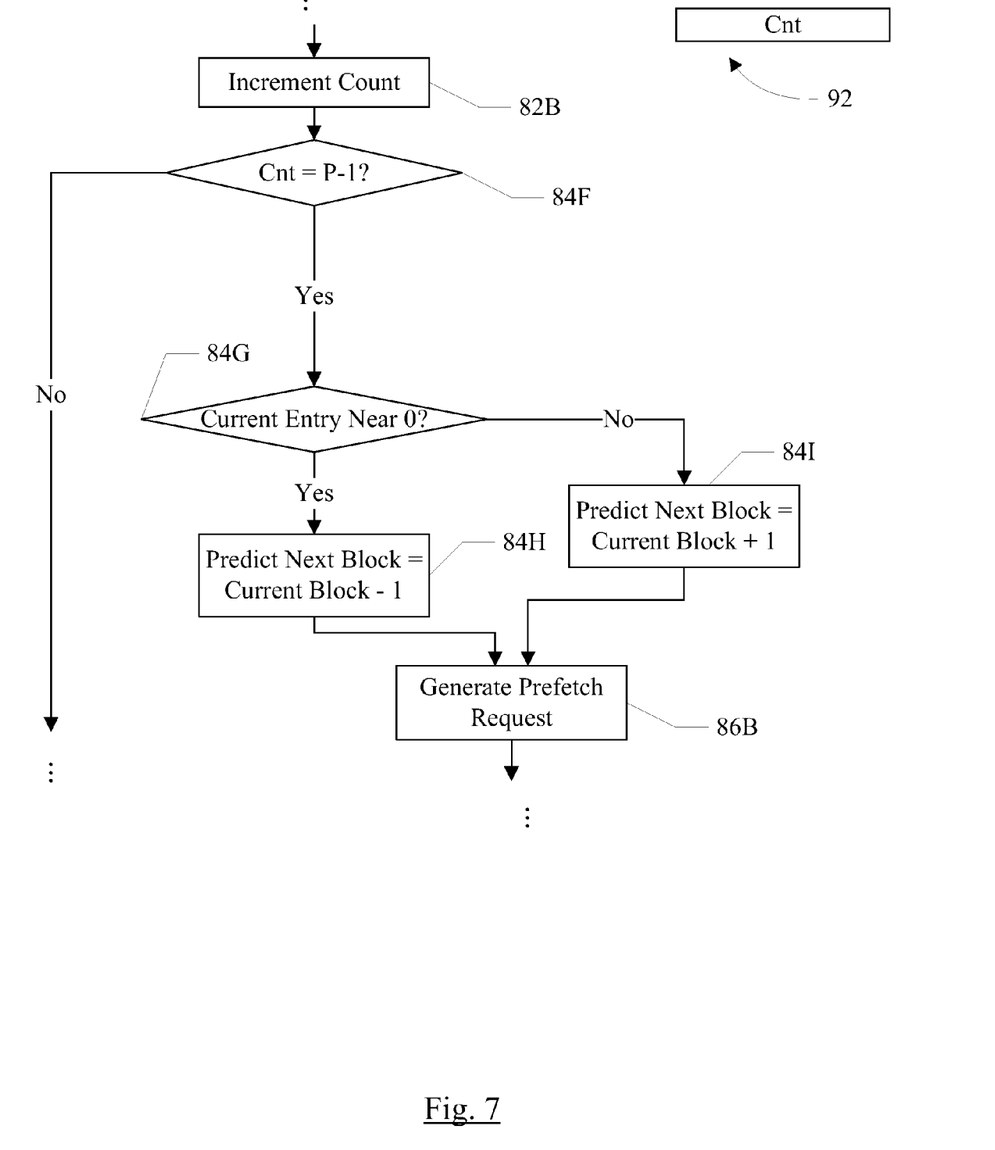
FIG. 7 is a flowchart illustrating another embodiment of a portion of the flowchart shown in FIG. 5.

FIGS. 6 and 7 are more detailed embodiments for blocks 82, 84, and 86 of FIG. 5 for two embodiments of the history. The blocks that, when combined, implement one of the blocks 82, 84, and 86 are listed with the corresponding reference numeral (82, 84, or 86) followed by a letter. The embodiment of FIG. 6 implements the history as a list of the Q most recent PTEs that have been used to supply a translation to the TLB 30 (i.e. the Q most recently accessed PTEs). The list may be by entry number, number the lowest-addressed PTE in the prefetch block as entry 0, and increasing with numerically increasing addresses to the highest-addressed entry in the prefetch block (entry P-1). The embodiment of FIG. 7 implements the history as a count of the number of PTEs that have been used to supply translations to the TLB 30. While blocks are shown in a particular order for ease of understanding in FIGS. 6 and 7, other orders may be used. Blocks may be performed in parallel in combinatorial logic in the MMU 16A/table walk unit 32. Blocks, combinations of blocks and/ or the flowchart as a whole may be pipelined over is multiple clock cycles.

In FIG. 6, an exemplary history 90 is shown as a list of PTE entry numbers. PTE entry number 1 may be the oldest (least recently accessed) PTE entry number. PTE entry number 2 may be the second oldest entry number, etc., up to PTE entry number Q. The history 90 may be a logical view of the list. The physical arrangement of the list may differ. For example, rather than shifting the PTE entry numbers in the list when a new entry number is added, the new entry number may replace the oldest entry number and a pointer to the newest entry number may be stored.

As shown in FIG. 6, the update of the history (block 82 in FIG. 5) may comprise replacing the oldest PTE entry number in the history 90 with the entry number of the PTE currently being loaded in to the TLB 30 (block 82A). The blocks forming the decision block 84 may include decision blocks 84A-84C and blocks 84D-84E. The table walk unit 32 may determine if there is a pattern in the most recent Q PTE accesses (decision block 84A). If there is no discernable pattern (decision block 84A, "no" leg), the table walk unit 32 may not generate a prefetch request. If there is a discernable pattern, the pattern may be either monotonically increasing (e.g. each entry number is greater than the previous entry number) or monotonically decreasing (each entry number is less than the previous entry number). If the pattern is monotonically increasing (decision block 84A, "yes, inc" leg), and the current entry is near the highest-addressed entry in the prefetch block (e.g. entry P-1) (decision block 84B, "yes" leg), the table walk unit 32 may predict that the next block to be prefetched is the current prefetch block+1 (block 84E). That is, the next block to be prefetched is the next consecutive prefetch block to the current block (at the next numerically higher prefetch block address). The table walk unit 32 may be configured to generate a prefetch request for the predicted prefetch block (block 86A). If the current entry is not near the highest-addressed entry (decision block 84B, "no" leg), no prefetch is predicted yet. Similarly, if the pattern is monotonically decreasing (decision block 84A, "yes, dec" leg), and the current entry is near the lowest-addressed entry in the prefetch block (e.g. entry 0) (decision block 84C, "yes" leg), the table walk unit 32 may predict that the next block to be prefetched is the current prefetch block−1 (block 84D). That is, the next block to be prefetched is the previous prefetch block to the current block (at the next numerically lower prefetch block address). The table walk unit 32 may be configured to generate a prefetch request for the predicted prefetch block (block 86A). If the current entry is not near the lowest-addressed entry (decision block 84C, "no" leg), no prefetch is predicted yet.

Decision blocks 84B and 84C may check for the current entry being "near" the highest-addressed entry or lowest-address entry in order to predict the next block early, and to prefetch the block before the first TLB miss within the block. Accordingly, the determination of "near" may depend on the latency to access the next prefetch block in memory and the latency before the remaining PTE entries of the current block are consumed by TLB misses. In some embodiments, to avoid overwriting entries that might be needed, the table walk unit may not generate the prefetch request until the entries in the current block have been consumed (e.g. "near" may be "equal"). In other embodiments, an entry may be "near" another if it is within one or more entries of the entry number (e.g. 1 or 2 entries away). In some cases, the pattern may indicate that entries are being skipped (e.g. every other entry may be read), and the determination of "tnear" may take the pattern into account. Additionally, if more than one prefetch block is maintained for the same requester (such that the newly prefetched block will not replace the current block), the determination of "near" may be more flexible.

Entries 0 and P-1 may be defined to be the "ends" of the prefetch block. That is, there are no more entries at lower addresses within the prefetch block below entry 0; and there are no more entries at higher addresses within the prefetch block beyond entry P-1. Thus, when the current entry is near an end of the block, the table walk unit 32 may generate a prefetch request for the block that is adjacent that end (e.g. the previous block, for entry 0, or the next consecutive block, for entry P-1).

Collectively, the "no" legs of decision blocks 84A, 84B, and 84C may be equivalent to the "no" leg of the decision block 84 in FIG. 5. The exits from blocks 84D and 84E may be the equivalent of the "yes" leg of the decision block 84 in FIG. 5. Blocks 82A and 86A may be the equivalents of blocks 82 and 86 in FIG. 5, respectively.

In FIG. 7, an exemplary history 92 is shown as count. The count may be initialized as discussed above with regard to FIG. 5. As shown in FIG. 7, the update of the history (block 82 in FIG. 5) may comprise incrementing the count (block 82B). The blocks forming the decision block 84 may include decision blocks 84F-84G and blocks 84H-84I. The table walk unit 32 may determine if the count is equal to P-1, indicating that the PTE entries of the current prefetch block have been consumed (decision block 84F). If not (decision block 84F, "no" leg), the table walk unit 32 may not generate a prefetch request. If so (decision block 84F, "yes" leg), the current entry may be near zero or near P-1. If the current entry is near 0 (decision block 84G, "yes" leg), the table walk unit 32 may predict that the next block to be prefetched is the current prefetch block−1 (block 84H). The table walk unit 32 may be configured to generate a prefetch request for the predicted prefetch block (block 86B). If the current entry is near the entry P-1 (decision block 84G, "no" leg), the table walk unit 32 may predict that the next block to be prefetched is the current prefetch block+1 (block 84I). The table walk unit 32 may be configured to generate a prefetch request for the predicted prefetch block (block 86B).

While the embodiment of FIG. 7 checks for the count being equal to P-1, other embodiments may check for the count being near P-1. Again, the measurement of near may depend on the latency to prefetch a block and the latency expected to consume the remaining entries in the current prefetch block, similar to the above discussion.

The "no" leg of decision block 84F may be equivalent to the "no" leg of the decision block 84 in FIG. 5. The exits from blocks 84H and 84I may be the equivalent of the "yes" leg of the decision block 84 in FIG. 5. Blocks 82B and 86B may be the equivalents of blocks 82 and 86 in FIG. 5, respectively.

Figure 8:
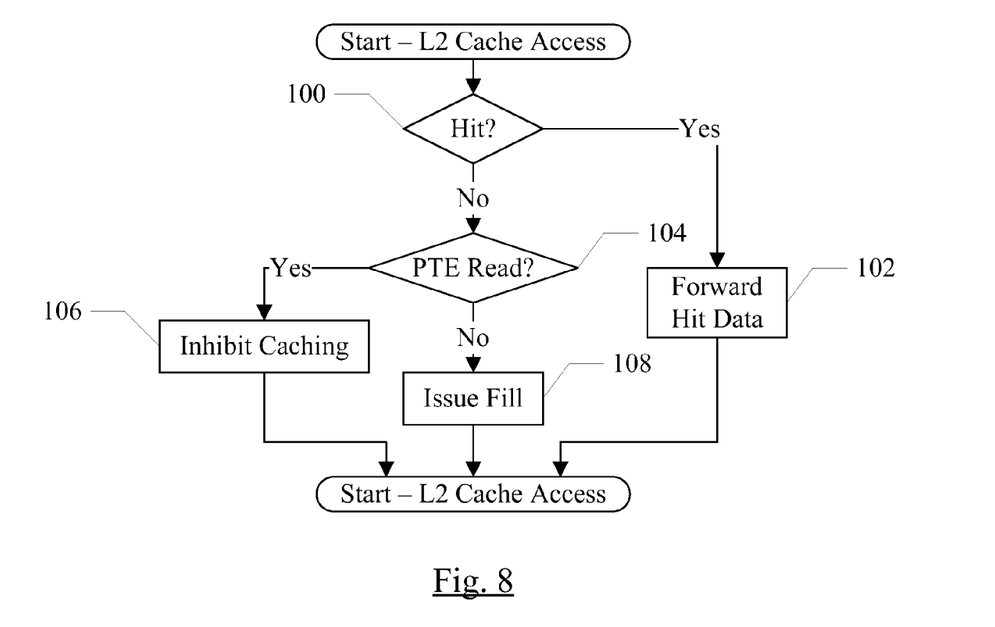
FIG. 8 is a flowchart illustrating operation of one embodiment of the system shown in FIG. 1 for a level 2 cache access.

In some embodiments, especially since the prefetch buffer 34 is storing prefetched PTEs, it may not be efficient to cache the PTEs in the caches (e.g. the L2 caches 12 and 24 in FIG. 1, L1 caches (not shown), etc.). Accordingly, in one embodiment, the caches may inhibit caching of data for PTE reads, while generally caching other data (unless it is marked uncacheable). FIG. 8 is a flowchart illustrating operation of one embodiment of the L2 caches 12 to inhibit caching of PTE reads. Other caches, including L2 caches 24, L1 caches, L3 caches, etc. may be similar. The L2 caches 12 may be configured to implement the operation illustrated in FIG. 8. While blocks are shown in a particular order for ease of understanding, other orders may be used. Blocks may be performed in parallel in combinatorial logic in the L2 caches 12. Blocks, combinations of blocks and/or the flowchart as a whole may be pipelined over multiple clock cycles. The flowchart of FIG. 8 illustrates operation in response to a cache access. The L2 caches 12 may be configured to process more than one access in parallel. Furthermore, in pipelined embodiments, cache access may be pipelined and thus there may be multiple cache accesses at various stages of processing.

The L2 cache may check for a hit on the request address (decision block 100). If the request is a hit (decision block 100, "yes" leg), the L2 cache may supply the data from the hitting cache line to the requester (block 102). If the request is a miss (decision block 100, "no" leg), the L2 cache may determine if the request is a PTE read (decision block 104). In some embodiments, a requestor ID that is supplied with the request to the L2 cache may indicate that the request is a PTE read. Alternatively, request type information or sideband signalling may be used to indicate whether or not the request is a PTE read. Any mechanism for communicating that the request is or is not a PTE read may be used. If the request is a PTE read (decision block 104, "yes" leg), the L2 cache may pass the request to the next level without allocating a cache block, inhibiting caching of the data (block 106). If the request is not a PTE read (decision block 104, "no" leg), the L2 cache may allocate a cache block storage location to store the miss, and may issue a fill to the next level (block 108).

Figure 9:
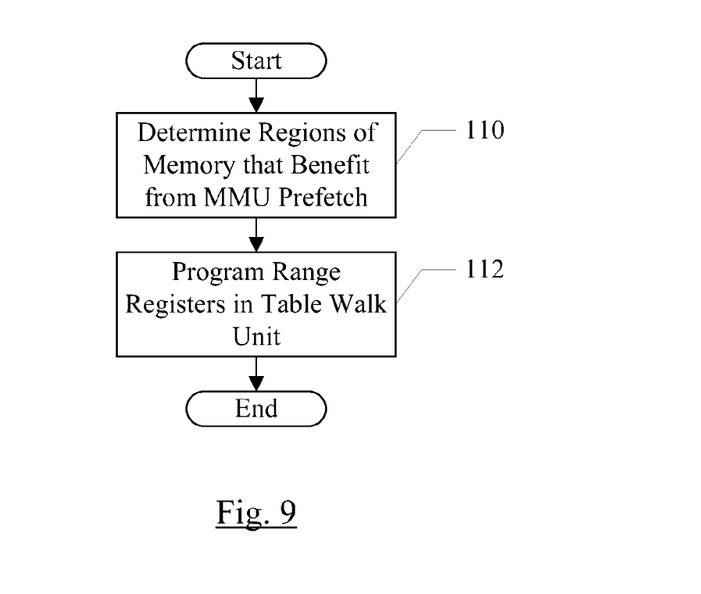
FIG. 9 is a flowchart illustrating one embodiment of control code.

Turning next to FIG. 9, a flowchart is shown illustrating operation of one embodiment of control code that may program the MMU 16A for prefetch operation. While the blocks are shown in a particular order for ease of understanding, other orders may be used. The instructions forming the control code may be executed, on a processor, to cause the system to perform the operations illustrated in FIG. 9.

The control code may determine regions of memory that may benefit from MMU prefetching (block 110). For example, the code may identify frame buffer locations, texture map locations, etc. The code may also identify request types that may benefit from prefetching, and may identify address ranges associated with those request types. The control code may write the range registers 38A-38R with the identified ranges (block 112).

System and Computer Accessible Storage Medium

Figure 10:
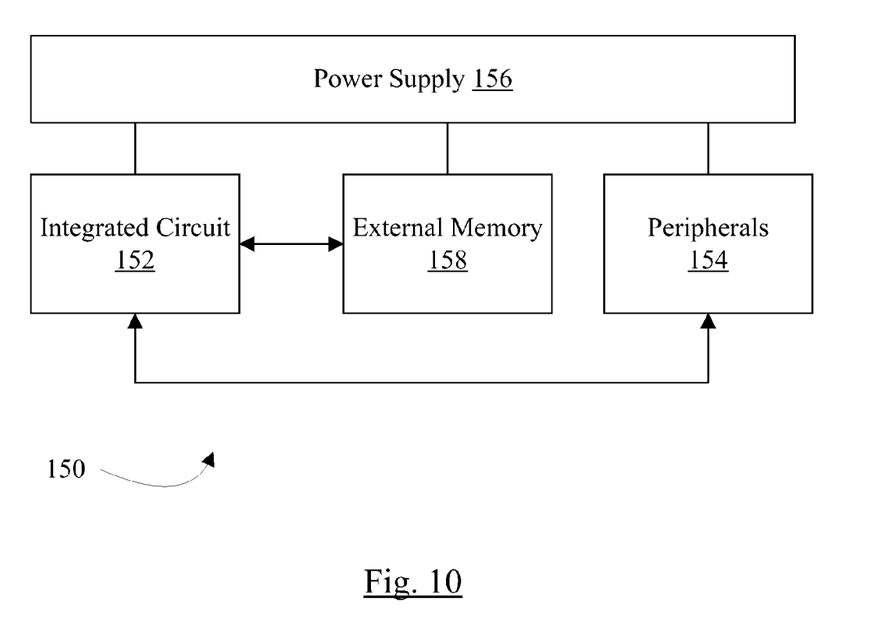
FIG. 10 is a block diagram of one embodiment of a system.

Turning next to FIG. 10, a block diagram of one embodiment of a system 150 is shown. The system 150 may be another embodiment of the system illustrated in FIG. 1. In the illustrated embodiment, the system 150 includes at least one instance of an integrated circuit 152 coupled to one or more peripherals 154 and an external memory 158. The integrated circuit 152 may include the GPUs 10, the L2 caches 12, the MCMBs 14, the CPUs 22, the L2 caches 24, and a memory controller for the main memory system 20, in one embodiment. The external memory 158 may include the memory from the main memory system 20. A power supply 156 is also provided which supplies the supply voltages to the integrated circuit 152 as well as one or more supply voltages to the memory 158 and/or the peripherals 154. In some embodiments, more than one instance of the integrated circuit 152 may be included (and more than one external memory 158 may be included as well).

The peripherals 154 may include any desired circuitry, depending on the type of system 150. For example, in one embodiment, the system 150 may be a mobile device (e.g. personal digital assistant (PDA), smart phone, etc.) and the peripherals 154 may include devices for various types of wireless communication, such as wifi, Bluetooth, cellular, global positioning system, etc. The peripherals 154 may also include additional storage, including RAM storage, solid state storage, or disk storage. The peripherals 154 may include user interface devices such as a display screen, including touch display screens or multitouch display screens, keyboard or other input devices, microphones, speakers, etc. In other embodiments, the system 150 may be any type of computing system (e.g. desktop personal computer, laptop, workstation, net top etc.).

Figure 11:
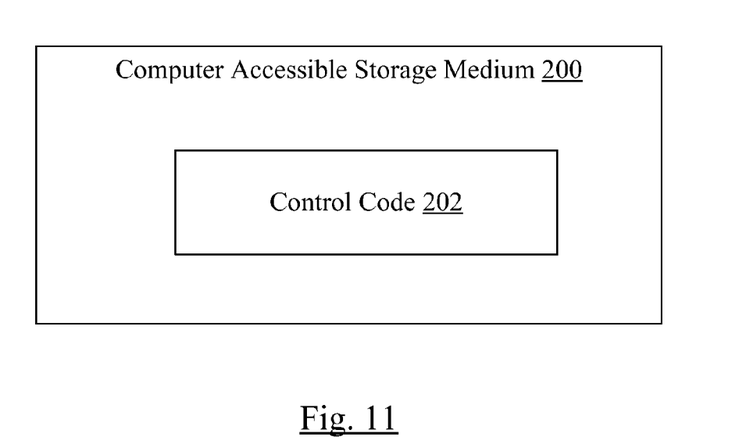
FIG. 11 is a block diagram of one embodiment of a computer accessible storage medium.

Turning now to FIG. 11, a block diagram of a computer accessible storage medium 200 is shown. Generally speaking, a computer accessible storage medium may include any storage media accessible by a computer during use to provide instructions and/or data to the computer. For example, a computer accessible storage medium may include storage media such as magnetic or optical media, e.g., disk (fixed or removable), tape, CD-ROM, or DVD-ROM, CD-R, CD-RW, DVD-R, DVD-RW. Storage media may further include volatile or non-volatile memory media such as RAM (e.g. synchronous dynamic RAM (SDRAM), Rambus DRAM (RDRAM), static RAM (SRAM), etc.), ROM, Flash memory, non-volatile memory (e.g. Flash memory) accessible via a peripheral interface such as the Universal Serial Bus (USB) interface, a flash memory interface (FMI), a serial peripheral interface (SPI), etc. Storage media may include microelectromechanical systems (MEMS), as well as storage media accessible via a communication medium such as a network and/or a wireless link. The computer accessible storage medium 200 in FIG. 11 may store control code 202, which may include the code described above with regard to FIG. 9. Generally, the computer accessible storage medium 200 may store any set of instructions which, when executed, implement a portion or all of the operation shown in FIG. 9. A carrier medium may include computer accessible storage media as well as transmission media such as wired or wireless transmission.

Numerous variations and modifications will become apparent to those skilled in the art once the above disclosure is fully appreciated. It is intended that the following claims be interpreted to embrace all such variations and modifications.

What is claimed is:

1. A memory management unit (MMU) comprising:
a translation lookaside buffer (TLB) configured to store a plurality of virtual to physical address translations that have previously been used to translate virtual addresses received by the MMU;
a buffer configured to store a block of data that includes a plurality of page table entries including a first page table entry previously read during a translation of a virtual address that missed in the TLB, and wherein the block of data was read in response to the virtual address that missed in the TLB and at least one of the plurality of page table entries was returned to the MMU along with the first page table entry as read data in response to a read request issued by the MMU to read the first page table entry, and wherein the at least one of the plurality of page table entries is not part of a translation for the virtual address that missed in the TLB, and wherein the buffer is configured to store only blocks of data that include page table entries, and wherein each page table entry maps a virtual page corresponding to the page table entry to a physical page defined by the page table entry; and a table walk unit coupled to the TLB and to the buffer, wherein the table walk unit is coupled to receive a first virtual address of a first TLB miss in the TLB, and wherein the table walk unit is configured to check the buffer for a second page table entry corresponding to the first virtual address prior to initiating a memory read for the translation.

2. The MMU as recited in claim 1 wherein the table walk unit is configured to detect the second page table entry in the buffer, and wherein the table walk unit is configured to write a translation from the second page table entry into the TLB.

3. The MMU as recited in claim 1 wherein the table walk unit is configured to detect that the second page table entry is not stored in the buffer, and wherein the table walk unit is configured to issue a memory read for a second block of data that includes the second page table entry.

4. The MMU as recited in claim 3 wherein the table walk unit is configured to write the second block to the buffer, overwriting the first block in the buffer.

5. The MMU as recited in claim 4 wherein the buffer is configured to store a plurality of blocks, wherein each block corresponds to a different identifier provided with translation requests transmitted to the MMU.

6. The MMU as recited in claim 1 wherein the block is larger than a cache block in size.

7. A memory management unit (MMU) comprising:
a translation lookaside buffer (TLB) configured to store a plurality of virtual to physical address translations;
a buffer configured to store a block of data that includes a plurality of page table entries, wherein each page table entry maps a virtual page corresponding to the page table entry to a physical page defined by the page table entry; and
a table walk unit coupled to the TLB and to the buffer, wherein the table walk unit is coupled to receive a first virtual address of a first TLB miss in the TLB, and wherein the table walk unit is configured to search the buffer for a first page table entry corresponding to the first virtual address prior to initiating a memory read for the translation, and wherein the table walk unit is configured to track a history of use of the plurality of page table entries and to generate a prefetch request for a second block of data that includes a second plurality of page table entries, wherein the table walk unit is configured to generate the prefetch request responsive to the history and further responsive to a hit of the first virtual address in the block of data stored in the buffer.

8. The MMU as recited in claim 7 wherein the history comprises an indication of a most recent Q page table entries read from the block, and wherein the table walk unit is configured to generate the prefetch request if the history indicates that a pattern of TLB misses is nearing an end of the block, and wherein Q is a positive integer greater than one.

9. The MMU as recited in claim 8 wherein the pattern is nearing an end of the block having a lowest numerical address, and wherein the second block is a block at a lower numerical address than the block.

10. The MMU as recited in claim 8 wherein the pattern is nearing an end of the block having a highest numerical address, and wherein the second block is a block at a higher numerical address than the block.

11. The MMU as recited in clam 7 wherein the history comprises an indication of a most recent Q page table entries read from the block, and wherein the table walk unit is configured to generate the prefetch request if the history indicates that a pattern of TLB misses has reached an end of the block, and wherein Q is a positive integer greater than one.

12. The MMU as recited in 7 wherein the history comprises a count of a number of the plurality of page table entries that have been read by the table walk unit, and wherein the table walk unit is configured to generate the prefetch request responsive to the count equaling the number of the plurality of page table entries.

13. The MMU as recited in 7 wherein the history comprises a count of a number of the plurality of page table entries that have been read by the table walk unit, and wherein the table walk unit is configured to generate the prefetch request responsive to the count nearing the number of the plurality of page table entries.

14. A system comprising:
a processor including a memory management unit (MMU), wherein the MMU is configured to fetch a block of page table entries and to store the plurality of page table entries for potential use in translations, wherein the MMU includes a translation lookaside buffer (TLB) and is configured to fetch the block of page table entries responsive to a TLB miss for a translation corresponding to a first page table entry of the page table entries in the block, and wherein the MMU is configured to retain the block of page table entries separate from the TLB for potential use and wherein at least one additional page table entry of the page table entries in the block was returned to the MMU along with the first page table entry as read data in response to a read request issued by the MMU to read the first page table entry, and wherein the additional page table entry is not part of a translation for the virtual address that missed in the TLB, and wherein each page table entry maps a virtual page corresponding to the page table entry to a physical page defined by the page table entry; and
a cache coupled to the processor, wherein the cache is configured to inhibit storing the block of page table entries prefetched by the processor.

15. The system as recited in claim 14 wherein the TLB is configured to fetch the block responsive to a history indicating that the block is likely to be accessed for a subsequent TLB miss.

16. The system as recited in claim 14 wherein the MMU is programmable with one or more ranges of addresses for which the MMU is to fetch the block of page table entries, wherein the MMU is configured not to retain the page table entries for an address outside of the one or more ranges.

17. A method comprising:
reading a block of data that comprises a plurality of page table entries from a memory in response to a translation lookaside buffer (TLB) miss for a first virtual address that is translated by a first page table entry of the plurality of page table entries;
retaining the block in a memory management unit (MMU) responsive to reading the block and writing the TLB with data corresponding to the first page table entry, wherein the retaining is in a buffer that is separate from the TLB and that is dedicated to storing blocks of data that comprise page table entries, including at least one page table entry returned to the MMU along with the first page table entry as read data in response to a read request issued by the MMU to read the first page table entry, and wherein the at least one of the plurality of page table entries is not part of a translation for the virtual address that missed in the TLB, and wherein each page table entry maps a virtual page corresponding to the page table entry to a physical page defined by the page table entry;

detecting another TLB miss in the MMU; and reading one of the plurality of page table entries from the buffer responsive to the detecting another TLB miss, to determine a translation for the other TLB miss.

18. The method as recited in claim 17 further comprising:

detecting a second TLB miss in the MMU;

determining that a second page table entry corresponding to the second TLB miss is not in the plurality of page table entries;

reading a second block of data that comprises a second plurality of page table entries including the second page table entry from the memory; and retaining the second block in the MMU.

19. The method as recited in claim 18 wherein retaining the second block in the MMU comprises overwriting the block with the second block.

20. The method as recited in claim 17 further comprising:

maintaining a history of use of the plurality of page table entries in the block; and generating a prefetch of a second block of data including a second plurality of page table entries responsive to the history.

21. A method comprising:

determining one or more address ranges that are expected to experience a regular pattern of translation lookaside buffer (TLB) misses; and programming one or more registers in a memory management unit (MMU) with the address ranges, wherein the MMU is configured to generate prefetch requests for blocks of page table entries, each block comprising a plurality of page table entries, responsive to TLB misses in the one or more address ranges, and wherein the MMU is configured to inhibit generating prefetch requests for TLB miss outside of the one or more ranges.

22. The method as recited in claim 21 wherein the determining comprises determining an address range assigned to a frame buffer used by a graphics unit.

23. The method as recited in claim 21 further comprising maintaining a history of use of the plurality of page table entries in a current block to generate a prefetch of a next block.

* * * * *

UNITED STATES PATENT AND TRADEMARK OFFICE
CERTIFICATE OF CORRECTION

PATENT NO. : 8,397,049 B2
APPLICATION NO. : 12/501643
DATED : March 12, 2013
INVENTOR(S) : James Wang et al.

It is certified that error appears in the above-identified patent and that said Letters Patent is hereby corrected as shown below:

In the Claims:

Claim 11, Column 18, Line 1, delete "clam" and substitute -- claim --

Claim 12, Column 18, Line 7, delete "recited in 7" and substitute -- recited in claim 7 --

Claim 13, Column 18, Line 13, delete "recited in 7" and substitute -- recited in claim 7 --

Signed and Sealed this
Eleventh Day of June, 2013

Teresa Stanek Rea
*Acting Director of the United States Patent and Trademark Office*